United States Patent
Weston et al.

(10) Patent No.: US 9,074,044 B2
(45) Date of Patent: Jul. 7, 2015

(54) METHOD FOR CONTINUOUSLY PRODUCING LOW EQUIVALENT WEIGHT POLYOLS USING DOUBLE METAL CYANIDE CATALYSTS

(75) Inventors: John W. Weston, Sugar Land, TX (US); Carlos M. Villa, Lake Jackson, TX (US); Jean-Paul Masy, Destelbergen (BE); Kevin C. Seavey, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 382 days.

(21) Appl. No.: 13/514,372

(22) PCT Filed: Dec. 6, 2010

(86) PCT No.: PCT/US2010/059038
§ 371 (c)(1),
(2), (4) Date: Jun. 7, 2012

(87) PCT Pub. No.: WO2011/075333
PCT Pub. Date: Jun. 23, 2011

(65) Prior Publication Data
US 2012/0283483 A1 Nov. 8, 2012

Related U.S. Application Data

(60) Provisional application No. 61/286,051, filed on Dec. 14, 2009.

(51) Int. Cl.
*C07C 41/03* (2006.01)
*C08G 65/26* (2006.01)

(52) U.S. Cl.
CPC ........ *C08G 65/2663* (2013.01); *C08G 65/2609* (2013.01); *C08G 65/2696* (2013.01)

(58) Field of Classification Search
CPC ........... C08G 65/2663; C08G 65/2609; C08G 65/2696; C07C 41/03
USPC ......................................... 568/624, 623, 620
See application file for complete search history.

(56) References Cited

U.S. PATENT DOCUMENTS

| | | |
|---|---|---|
| 5,689,012 A | 11/1997 | Pazos |
| 5,777,177 A | 7/1998 | Pazos |
| 5,919,988 A | 7/1999 | Pazos |
| 6,077,978 A | 6/2000 | McDaniel |
| 6,410,801 B1 | 6/2002 | Hinz |
| 6,541,673 B1 | 4/2003 | Rodriguez |
| 2005/0107643 A1 | 5/2005 | Ostrowski |
| 2005/0209438 A1 | 9/2005 | Browne |
| 2007/0225394 A1* | 9/2007 | Ostrowski et al. ............ 521/189 |

FOREIGN PATENT DOCUMENTS

| | | | | |
|---|---|---|---|---|
| EP | 0743093 B1 * | 12/2001 | ............... | B01J 27/26 |
| EP | 1295902 A | 3/2003 | | |
| EP | 1577334 A | 9/2005 | | |
| WO | 97/29146 A | 8/1997 | | |
| WO | 99-14258 A | 3/1999 | | |

* cited by examiner

Primary Examiner — Rosalynd Keys
(74) Attorney, Agent, or Firm — Gary C Cohn PLLC

(57) ABSTRACT

Polyether polyols having equivalent weights of up to 500 are continuously prepared in the presence of a double metal cyanide catalyst. A first step of the reaction is performed at a temperature of at least 150° C., while controlling the hydroxyl content and unreacted alkylene oxide content of the reaction mixture to within certain ranges. A portion of that reaction mixture is withdrawn and permitted to react non-isothermally to consume the unreacted alkylene oxide. This process is highly efficient, does not result in catalyst deactivation, as is commonly seen in previous processes, and does not produce a significant ultra high molecular weight tail.

12 Claims, No Drawings

METHOD FOR CONTINUOUSLY PRODUCING LOW EQUIVALENT WEIGHT POLYOLS USING DOUBLE METAL CYANIDE CATALYSTS

This application claims priority from U.S. Provisional Patent Application No. 61/286,051, filed 14 Dec. 2009.

This invention relates to a method for continuously polymerizing an alkylene oxide in the presence of a double metal cyanide catalyst.

Double metal cyanide (DMC) catalysts are increasingly being used to polymerize propylene oxide to produce polyether polyols. An advantage of the DMC catalysts is that they do not promote the rearrangement of propylene oxide into propenyl alcohol. Propenyl alcohol acts as a monofunctional initiator in a propylene oxide polymerization reaction. Its presence results in poly(propylene oxide) monoalcohols forming as an impurity. These monoalcohols can have detrimental effects when the polyol is used to form a polyurethane and/or polyurea polymer, and so it is a significant advantage of DMC catalysts that these monoalcohols do not form in the polymerization process.

Another advantage of using the DMC catalysts is that the catalyst residues often can be left in the product, unlike the case when alkali metal hydroxides are used as the polymerization catalyst. This can result in lower production costs.

A third advantage of DMC catalysts is that, unlike alkali metal hydroxide catalysts, they produce low polydispersity polymers when the polymerization is performed in a back-mixed main reactor.

On the other hand, DMC catalysts have certain drawbacks which limit their use in some polymerization processes. One problem with DMC catalysts is that they tend to deactivate in the presence of high concentrations of hydroxyl groups. This problem is described, for example, in U. S. Published Patent Application No. 2005-0209438 and U.S. Pat. No. 6,077,978. This problem makes it difficult to produce low (about 85 to 500) equivalent weight polyol products efficiently using DMC catalysts, or to conduct the polymerization in the presence of high concentrations of low molecular weight initiators. Glycerine is a particularly troublesome initiator in this respect. One approach to resolving this problem is to partially alkoxylate the initiator using an alkali metal catalyst, and then remove the catalyst and further alkoxylate this intermediate using the DMC catalyst. However, that approach is more costly than simply performing the entire alkoxylation in the presence of the alkali metal catalyst. A second approach is to add an acid to the initiator, as described in U. S. Published Patent Application No. 2005-0209438. However, this second approach has not led to the commercial production of low equivalent weight polyols using DMC catalysts.

Another problem with DMC catalysts is that they tend to produce a very small amount of an extremely high (100,000+) molecular weight polymer, which is sometimes referred to as an ultra high molecular weight tail. This is described, for example, in U.S. Pat. No. 5,777,177. U. S Published Patent Application No. 2005-0209438 suggests the problem may be more acute when lower equivalent weight products are produced, because of the high concentration of hydroxyl groups present in those polymerizations. The ultra high molecular weight tail can cause difficulties with the foaming process when the polyol is reacted with an isocyanate to produce a polyurethane foam.

An efficient, inexpensive continuous process is desired, by which an alkylene oxide can be polymerized in the presence of an initiator compound and a DMC catalyst to form an 85-500 equivalent weight polyol.

This invention is a process for continuously polymerizing an alkylene oxide in the presence of a double metal cyanide polymerization catalyst to form a polyether polyol having a hydroxyl content of from about 3.4 to 20% by weight, wherein:

in a first step a), an initiator compound and at least one alkylene oxide are fed to a continuous reactor containing a double metal cyanide catalyst, and a partially polymerized mixture is withdrawn from the continuous reactor, wherein (i) the continuous reactor is maintained at a polymerization temperature in excess of 150° C., (ii) the concentration of unreacted alkylene oxide in the contents of the continuous reactor is maintained at a level of from 1.3 to 5% by weight, and (iii) the hydroxyl content of the contents of the continuous reactor is maintained at 3.4 to 20% by weight and in a subsequent step b), the partially polymerized mixture withdrawn from the reactor in step a) is permitted to further react non-isothermally until the unreacted alkylene oxide content of the mixture is reduced to 0.5% or less by weight.

This process permits polyether polyols having a hydroxyl equivalent weight of from 85 to 500 (corresponding to a hydroxyl content of about 20% down as low as 3.4% by weight) to be produced efficiently from initiator compounds that have hydroxyl equivalent weights as low as about 30. The process produces little of the ultra high molecular weight "tail" material. Surprisingly, it has been found that the conditions in step a) mostly or entirely overcome the initial sluggishness and/or deactivation of the DMC catalyst. As a result, the DMC catalyst can be used in small quantities, such as 100 ppm or less, based on the weight of the final polyol product. Despite the relatively high level of unreacted alkylene oxide in the reaction mixture that is withdrawn from the continuous reactor, the reaction finishes efficiently in the second step and the final product has a low concentration of residual alkylene oxide. In addition, no significant quantity of ultra high molecular tail is present in the product, despite the high polymerization temperatures and high hydroxyl concentrations, and so the product is useful for polyurethane foam formulations.

The first step of the reaction can be performed in any type of vessel that is suitable for continuous reactions. The vessel must have one or more inlets through which an initiator and the alkylene oxide can be introduced during the process, and at least one outlet through which a portion of the partially polymerized reaction mixture can be withdrawn. The reactor should be designed to withstand the reaction pressures, which can be considerable due to the volatility of the alkylene oxides at the reaction temperatures. A tubular reactor that has multiple points for injecting the starting materials, a loop reactor, and a continuous stirred tank reactor (CTSR) are all suitable types of vessels. The reaction vessel contains a double metal cyanide catalyst, which may be continuously introduced during the polymerization process. The reactor should be equipped with a means of providing or removing heat, so the temperature of the reaction mixture can be maintained within the required range, as described more fully below. Suitable means include various types of jacketing for thermal fluids, various types of internal or external heaters, and the like.

During the first step of the reaction, the concentration of unreacted alkylene oxide is maintained at a level of from 1.3 to 5% by weight, both within the contents of the continuous reactor and in the mixture withdrawn from the continuous reactor. The unreacted alkylene oxide concentration is preferably from 2 to 3% by weight. In addition, the hydroxyl content of the reactor contents and of the mixture withdrawn from the continuous reactor is maintained at 3.4 to 20% by weight. This hydroxyl content is preferably from 5 to 20% by weight and more preferably from 5 to 10% by weight. These values are established and maintained primarily through the reaction kinetics, which depend largely on the particular starting materials (the initiator and the alkylene oxide, and optionally catalyst and an alkoxylated initiator as described below) temperature and catalyst concentration, and the average residence time in the reactor, which is determined mainly by the rates at which starting materials are added and a portion of the partially polymerized reaction mixture is removed. Therefore, the addition and removal rates are established in conjunction with the temperature and catalyst concentration so that the aforementioned values of hydroxyl content and unreacted alkylene oxide are established in the continuous reactor. These parameters will directly affect the increase in molecular weight that takes place in the continuous reactor. The build ratio (the ratio of the average molecular weight of the partially polymerized reaction mixture to that of the initiator compound) in step a) is commonly from about 2.5 to about 15, and are more commonly from about 7 to about 11.

In step a), the initiator and the alkylene oxide are preferably charged continuously to the continuous reactor, as this best promotes the establishment of steady-state conditions in the continuous reactor, in which temperature, hydroxyl concentration and alkylene oxide content remain change little if at all over time.

The continuous reactor contains a double metal cyanide catalyst in an amount sufficient to provide a commercially reasonable polymerization rate under the particular reaction conditions employed. As some of the catalyst is usually withdrawn with the partially polymerized reaction mixture that is removed during the second step, it is generally desirable to introduce the double metal catalyst continuously or intermittently during the operation of the continuous reactor as needed to replace the catalyst that is withdrawn. The catalyst is conveniently added as a mixture or slurry in the initiator compound.

It is generally desirable to use as little of the double metal cyanide catalyst as possible, consistent with reasonable polymerization rates, as this both reduces the cost for the catalyst and, if the catalyst levels are low enough, can eliminate the need to remove catalyst residues from the product. A preferred catalyst level is from 10 to 100 ppm, based on the weight of the finished product. A more preferred amount is at least 20 ppm, and up to 50 ppm.

The temperature of the reaction contents in the first step is greater than 150° C., and preferably greater than 160° C. This temperature may be 200° C. or higher, but it is preferred that the temperature does not exceed 190° C., more preferably 180° C., in order to maintain workable reactor pressures and to avoid forming a significant amount of volatile impurities or other by-products.

A portion of the partially polymerized reaction mixture is withdrawn from the continuous reactor, preferably continuously but possibly intermittently in some embodiments, and then permitted to react non-isothermally in step b). By "non-isothermally", it is meant that step b) is performed such that the temperature of the partially polymerized reaction mixture can increase during this step due to the exothermic reaction of the residual alkylene oxide onto the end of the polymer chains. Minimal or no external cooling should be applied in step b); heating is generally unnecessary because of the exothermic nature of the polymerization reaction that occurs in this step. The temperature of the reaction mixture entering this step is 150° C. or greater, preferably 160° C. or greater, preferably up to 220° C. and more preferably up to 200° C. or 185° C. as described before. Typically, the reaction mixture in step b) may increase in temperature by up to 35° C. as a result of this exothermic polymerization. A more typical temperature increase is from 10 to 25° C.

The partially polymerized reaction mixture withdrawn from step a) will have a composition approximately the same as that of the reaction mixture in the continuous reactor. In particular, the hydroxyl content and alkylene oxide content will be as described before with respect to the reaction mixture inside the continuous reactor. Therefore, the withdrawn partially polymerized reaction mixture will have a hydroxyl content and concentration of unreacted oxides as described before, with regard to the mixture in the continuous reactor. During step b), the partially polymerized reaction mixture continues to polymerize, and the residual alkylene oxide is consumed. The hydroxyl content of the reaction mixture may drop slightly during this step. This reaction continues in step b) until the alkylene oxide content of the mixture is reduced to 0.5% by weight or less, preferably to 0.25% by weight or less, more preferably 0.1% or less and still more preferably 0.05% or less. A typical residence time in step b) is from 25 to 40 minutes.

Step b) is conveniently conducted in a reactor which prevents significant back-mixing from occurring. A pipe or other tubular reactor is entirely suitable, and plug flow operation in a pipe or tubular reactor is a preferred manner of performing step b).

The product exiting step b) is a polyether polyol which may contain up to 0.5% by weight, based on the total weight, of unreacted alkylene oxide; catalyst residues, which preferably are present at 100 ppm or less, especially 50 ppm or less; small quantities of the initiator compound and low molecular weight alkoxylates thereof; and small quantities of other organic impurities and water. Volatile impurities should be flashed or stripped from the polyol. It is typical to leave the catalyst residues in the product, but these can be removed if desired. Moisture can be removed by stripping the polyol.

The molecular weight of the polyether polyol will increase slightly during step b). At the end of step b), the polyether product will have a hydroxyl content of from 3.4 to 20%, which corresponds to a hydroxyl equivalent weight of from 85 to 500. The polyether product preferably has a hydroxyl content of from 4.8 to 11.3%, which corresponds to a hydroxyl equivalent weight of from about 150 to 350. A more preferred polyether product has a hydroxyl content of from 8.5 to 11.3%, which corresponds to a hydroxyl equivalent weight of about 200 to about 350.

The ratio of the hydroxyl equivalent weight of the product to that of the initiator compound (overall build ratio) should be at least 2.8:1, and is preferably at least 4:1 and more preferably at least 5:1. This ratio may be as much as about 16:1 and preferably is up to about 11.5:1. When glycerine is the initiator, the preferred build ratio is from 5 to 11.5, preferably from 8 to 11.5.

The initiator is an organic compound that has at least two hydroxyl groups per molecule and a hydroxyl equivalent weight of up to about 115. The hydroxyl groups are preferably aliphatic. Examples of suitable initiator compounds include monoethylene glycol, diethylene glycol, triethylene glycol, 1,2-propane diol, 1,3-propane diol, 1,4-butane diol, 1,6-hexane diol, cyclohexane dimethanol, glycerine, trimethylolpropane, triethylolpropane, triethanolamine, triisopropanolamine, pentaerythritol, and the like, as well as alkoxylates thereof that have hydroxyl equivalent weights up to about 115, preferably up to about 90. Glycerine, 1,2-propane diol and trimethylolpropane are preferred initiators. Glycerine is most preferred. The initiator may by neutralized with or contain a small amount of an acid, particularly if it is prepared in the presence of a base (as is the case with glycerine). If an acid is present, it may present in an amount of from about 10 to 100 ppm, based on the weight of the initiator, as described in U.S. Pat. No. 6,077,978. Alternatively, the acid may be used in somewhat larger amounts, such as from 100 to 1000 ppm, again based on the weight of the initiator, as described in US Published Patent Application No. 2005-0209438.

The alkylene oxide may be any polymerizable cyclic oxide including, for example, ethylene oxide, 1,2-propylene oxide, 1,2-butylene oxide, 2,3-butylene oxide, 1,4-butylene oxide (tetrahydrofuran), 1,2-hexane oxide, styrene oxide and the like. Propylene oxide is especially preferred, as are mixtures of propylene oxide and ethylene oxide. A mixture of propylene oxide and ethylene oxide preferably contains at least 50%, more preferably at least 85% by weight propylene oxide.

Suitable double metal cyanide catalysts include those described, for example, in U.S. Pat. No. 5,470,813. Some suitable DMC catalysts can be represented by the formula

$$M_b[M^1(CN)_r(X)_t]_c[M^2(X)_6]_d \cdot nM^3_xA_y$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer.

M and $M^3$ each are preferably a metal ion selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$, with $Zn^{+2}$ being preferred. $M^1$ and $M^2$ are preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred.

Suitable anions A include halides such as chloride and bromide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

r is preferably 5 or 6; t is preferably 0 or 1, most preferably 0. w is usually 2 or 3, and is most typically 3. In most cases, r+t will equal six.

An especially preferred type of DMC catalyst is a zinc hexacyanocobaltate catalyst complex as described, for example, in any of U.S. Pat. Nos. 3,278,457, 3,278,458, 3,278,459, 3,404,109, 3,427,256, 3,427,334, 3,427,335 and 5,470,813.

As mentioned, an alkoxylated initiator may be added into step a) of the process. The alkoxylated initiator is the reaction product of an alkylene oxide with an initiator compound as described before. The alkoxylated initiator may have any molecular weight between that of the initiator itself and that of the product of the polymerization process. A particularly suitable alkoxylated initiator is a polyether polyol which corresponds to the product of the polymerization reaction. This alkoxylated initiator may be added during startup and/or initial stages of the polymerization, to allow polymerization conditions to be established in the continuous reactor before steady state conditions are achieved. The alkoxylated initiator may be added once steady stage conditions are achieved, if needed to adjust the hydroxyl content or alkylene oxide concentration of the reaction mixture. The alkoxylated initiator may also be added as a carrier for the DMC catalyst. However, addition of the alkoxylated initiator is optional and can be omitted altogether.

Polyether polyols produced in accordance with the invention are useful for making polyurethanes, among other things. Polyurethane foams are an application of particular interest. When used as the main polyol in a polyurethane foam formulation, these polyols are useful in making so-called viscoelastic or "memory" foams. The polyether polyols tend to have properties quite similar to those made in conventional DMC-catalyzed polymerization process and in alkali metal hydroxide-catalyzed polymerization processes.

The following examples are provided to illustrate the invention, but are not intended to limit the scope thereof. All parts and percentages are by weight unless otherwise indicated.

EXAMPLE 1

A propylene oxide polymerization reaction is performed in a recirculating loop reactor followed with a plug flow tube reactor, of the general type described in U.S. Pat. No. 7,378,559. A recirculating flow is established in the loop reactor and a steady state temperature of 160° C. is established. Three streams are introduced into the loop reactor: a catalyst stream at the rate of 0.072 parts/hour, which consists of 1% by weight of a zinc hexacyanocobaltate catalyst complex in glycerine; 1.58 parts/hour of glycerine which contains 75 ppm of phosphoric acid; and 16.3 parts/hour of propylene oxide. The DMC catalyst concentration is approximately 40 ppm, based on the product weight. A portion of the reaction mixture is withdrawn and allowed to flow through the tube reactor, at the same rate as the combined feeds. The loop reactor is sized such that the average residence time in the loop reactor is approximately five hours. Upon reaching steady state conditions, the concentration of alkylene oxide in the loop reactor is approximately 1.3% and the hydroxyl content of the recirculating reaction mixture is about 5% by weight. The material withdrawn is permitted to react non-isothermally in the tube reactor, which results in a temperature increase in the tubular reactor. The tube reactor is sized such that the residence time in the tube reactor is two hours. During this step, the alkylene oxide concentration in the product is reduced to about 0.4 ppm, to yield a product having a hydroxyl number of 165 (OH equivalent weight of 340). The overall build ratio is about 10. The water content of the product is 0.19%; the propenyl unsaturation is 0.086 microequivalents/gram. The kinematic product viscosity is 300 cst. The product has minimal discernible ultra high molecular weight tail.

EXAMPLE 2

A propylene oxide polymerization reaction is performed in a recirculating loop reactor followed with a plug flow tube reactor of the type described in U.S. Pat. No. 7,378,559. Three streams are introduced into the loop reactor to establish a recirculating flow: a catalyst stream, which consists of 1% by weight of a zinc hexacyanocobaltate catalyst complex in glycerine; glycerine, which contains 75 ppm of phosphoric acid; and propylene oxide. The ratios of these streams are such that a steady state hydroxyl concentration of about 1.7% by weight is established. The polymerization temperature at this point is from 130 to 150° C. A portion of the reaction mixture is withdrawn and allowed to flow through the tube reactor, at the same rate as the combined feeds and allowed to finish reacting in the tube reactor. The polyol produced in this step has a hydroxyl equivalent weight of about 1000. Without discontinuing the reaction, the feed rates of the three streams are adjusted in several step so that the catalyst stream feed rate is brought to 0.090 parts/hour; the glycerine feed rate is brought to 2.21 parts/hour; and the propylene oxide feed rate is brought to 15.7 parts/hour. These ratios produce a DMC catalyst concentration of approximately 50 ppm, based on the product weight. The temperature in the loop reactor is simultaneously increased to 160° C. The average residence time in the loop reactor is now approximately five hours. Upon again reaching steady state conditions, the concentration of alkylene oxide in the loop reactor is approximately 2.3-3.1% and the hydroxyl content of the recirculating reaction mixture is about 7% by weight. The material withdrawn is permitted to react non-isothermally in the tube reactor, which results in a temperature increase in the tubular reactor. The residence time in the tubular reactor is now about 2 hours. During this step, the alkylene oxide concentration in the product is reduced to about 7.2 ppm, to yield a product having a hydroxyl number of 232 (OH equivalent weight of 241). The overall build ratio is about 8. The water content of the product is 0.01%; the propenyl unsaturation is 1.38 microequivalents/gram. The kinematic product viscosity is 286 cst. The product has minimal ultra high molecular weight tail.

This example demonstrates a significant advantage of the invention—the same polymerization equipment can be used to produce polyether polyol products that have a wide range of equivalent weights, simply by changing feed ratios and operating temperatures. For a brief period following a change in conditions, when switching from producing one product to another, some off-grade or high polydispersity product may be produced, however, this amount is often small and can be discarded, used in lower value applications or, because the volume is usually small, even blended with prime product.

EXAMPLE 3

A propylene oxide polymerization reaction is performed in a recirculating loop reactor followed with a plug flow tube reactor, as described before. A recirculating flow is established in the loop reactor and a steady state temperature of 160° C. is established. Three streams are introduced into the loop reactor: a catalyst stream at the rate of 0.180 parts/hour, which consists of 1% by weight of a zinc hexacyanocobaltate catalyst complex in glycerine; 2.1 parts/hour of glycerine which contains 75 ppm of phosphoric acid; and 15.7 parts/hour of propylene oxide. The DMC catalyst concentration is approximately 100 ppm, based on the product weight. A portion of the reaction mixture is withdrawn and allowed to flow through the tube reactor, at the same rate as the combined feeds. The loop reactor is sized such that the average residence time in the loop reactor is approximately five hours. Upon reaching steady state conditions, the concentration of alkylene oxide in the loop reactor is approximately 1.5% and the hydroxyl content of the recirculating reaction mixture is about 7% by weight. The withdrawn material is permitted to react non-isothermally in the tube reactor for two hours, which results in a temperature increase in the tubular reactor. During this step, the alkylene oxide concentration in the product is reduced, to yield a product having a hydroxyl number of 235. The overall build ratio is about 8. The water content of the product is 0.009%; the propenyl unsaturation is 1.41 microequivalents/gram. The kinematic product viscosity is 291 cst. The product has minimal ultra high molecular weight tail. The product has a slight pink color due to the somewhat high (100 ppm) catalyst loading. The product is stripped with steam to remove volatiles formed during the polymerization and antioxidant is added.

The product is foamed by reaction with water and toluene diisocyanate to produce a good quality slabstock foam. The properties of the resulting foam are measured according to ASTM D-357 and are as reported in the following table. For comparison, a similar foam is made using a conventional, potassium hydroxide-catalyzed polyether polyol of like equivalent weight and functionality; properties of that foam (Comparative Sample A) also are shown in the table.

TABLE

| | Comparative Sample A | Example 3 |
|---|---|---|
| Tin catalyst level pphp[1] | 0.02 | 0.01 |
| Airflow, L/minute | 0.39 | 0.22 |
| 75% Compression set, % | 2.1 | 1.2 |
| 90% Compression set, % | 1 | 1 |
| Resilience, % | 2 | 3 |
| 50% Compression force deflection, kPa | 2.33 | 3.25 |
| Density, kg/m$^3$ | 54.5 | 56.7 |
| Tear strength, N/m | 270 | 291 |
| Tensile strength, kPa | 109 | 118 |
| Elongation @ break, % | 226 | 199 |

[1]Amount of organotin catalyst present in foam formulation, per 100 parts by weight of polyol.

The properties of the two foams are generally comparable, despite the smaller level of catalyst used to produce the Example 3 foam. Only the compression force deflection value is statistically different between the two foams; the foam made from the Example 3 polyol is significantly harder.

What is claimed is:

1. A process for continuously polymerizing an alkylene oxide in the presence of a double metal cyanide polymerization catalyst to form a polyether polyol having a hydroxyl content of from about 3.4 to 20% by weight, wherein:
   in a first step a), an initiator compound that has at least two hydroxyl groups per molecule and a hydroxyl equivalent weight of up to 115 and at least one alkylene oxide are fed to a continuous reactor containing a double metal cyanide catalyst, and a partially polymerized mixture is withdrawn from the continuous reactor, wherein (i) the continuous reactor is maintained at a polymerization temperature in excess of 150° C., (ii) the concentration of unreacted alkylene oxide in the contents of the continuous reactor is maintained at a level of from 1.3 to 5% by weight, and (iii) the hydroxyl content of the reactor contents is maintained at 5 to 10% by weight and
   in a subsequent step b), the partially polymerized mixture is withdrawn from the reactor in step a) is permitted to further polymerize exothermically without applied heating until the unreacted alkylene oxide content of the mixture is reduced to 0.5% or less by weight,
   wherein the build ratio in step a) is from 2.5 to 15 and the overall build ratio is from 2.8 to 16, and further wherein the reaction mixture in step (b) increases by 10 to 25° C. as a result of the exothermic polymerization reaction.

2. The process of claim 1 wherein the alkylene oxide is propylene oxide or a mixture of propylene oxide and ethylene oxide that contains at least 85% by weight propylene oxide.

3. The process of claim 2 wherein the unreacted alkylene oxide in the contents of the continuous reactor is maintained at a level of from 2 to 5% by weight.

4. The process of claim 3 wherein the initiator is glycerine.

5. The process of claim 1 wherein step a) is performed in a loop reactor and step b) is performed in a pipe reactor.

6. The process of claim 1 wherein step a) is performed in a continuously stirred tank reactor and step b) is performed in a pipe reactor.

7. The process of claim 1 wherein the concentration of the double metal cyanide catalyst in step a) is from 10 to 100 ppm, based on the weight of the product.

8. The process of claim 1 wherein the temperature in step a) is from 160 to 190° C.

9. The process of claim 1 wherein the double metal cyanide catalyst is a zinc hexacyanocobaltate catalyst complex.

10. The process of claim 2 wherein the product polyether polyol has a hydroxyl content of from 8.5 to 11.3% by weight.

11. The process of claim 1 wherein the initiator is glycerine and the overall build ratio is from 8 to 11.5.

12. The process of claim 1 wherein in step b), the temperature of the partially polymerized reaction mixture increases by from 10 to 25° C.

* * * * *